United States Patent [19]
Crowe

[11] 3,724,506
[45] Apr. 3, 1973

[54] PIPE HAVING DISPOSABLE PROTECTIVE MEANS THEREON AND METHOD OF MAKING SAME

[76] Inventor: Larry G. Crowe, 1020 3rd Avenue, N.E., Waverly, Iowa 50677

[22] Filed: Feb. 22, 1971

[21] Appl. No.: 117,616

[52] U.S. Cl. ..................138/96, 25/39, 264/228
[51] Int. Cl. ..................B65d 59/00, B28b 21/22
[58] Field of Search ............138/96, 175; 25/30, 39; 249/95, 96; 264/228, 271, 275

[56] References Cited

UNITED STATES PATENTS

| | | |
|---|---|---|
| 2,602,469 | 7/1952 | Whiting..........................264/228 X |
| 3,114,956 | 12/1963 | Gannaway..............................25/39 |
| 3,341,910 | 9/1967 | Hesselholt..............................25/39 |
| 3,616,500 | 11/1971 | Peck et al..............................25/39 |

*Primary Examiner*—William R. Cline
*Attorney*—Zarley, McKee & Thomte

[57] ABSTRACT

A pipe having a resilient disposable protective ring on one end thereof, wherein the ring is utilized during manufacture of the pipe for forming an annular groove at one end of the pipe for receiving an O-ring therein when the pipe is installed to another pipe, said ring being left in place after the pipe is manufactured to prevent breakage of the pipe during storage and handling of the pipe, and said ring being removed and thrown away when the pipe is to be installed to another pipe.

3 Claims, 6 Drawing Figures

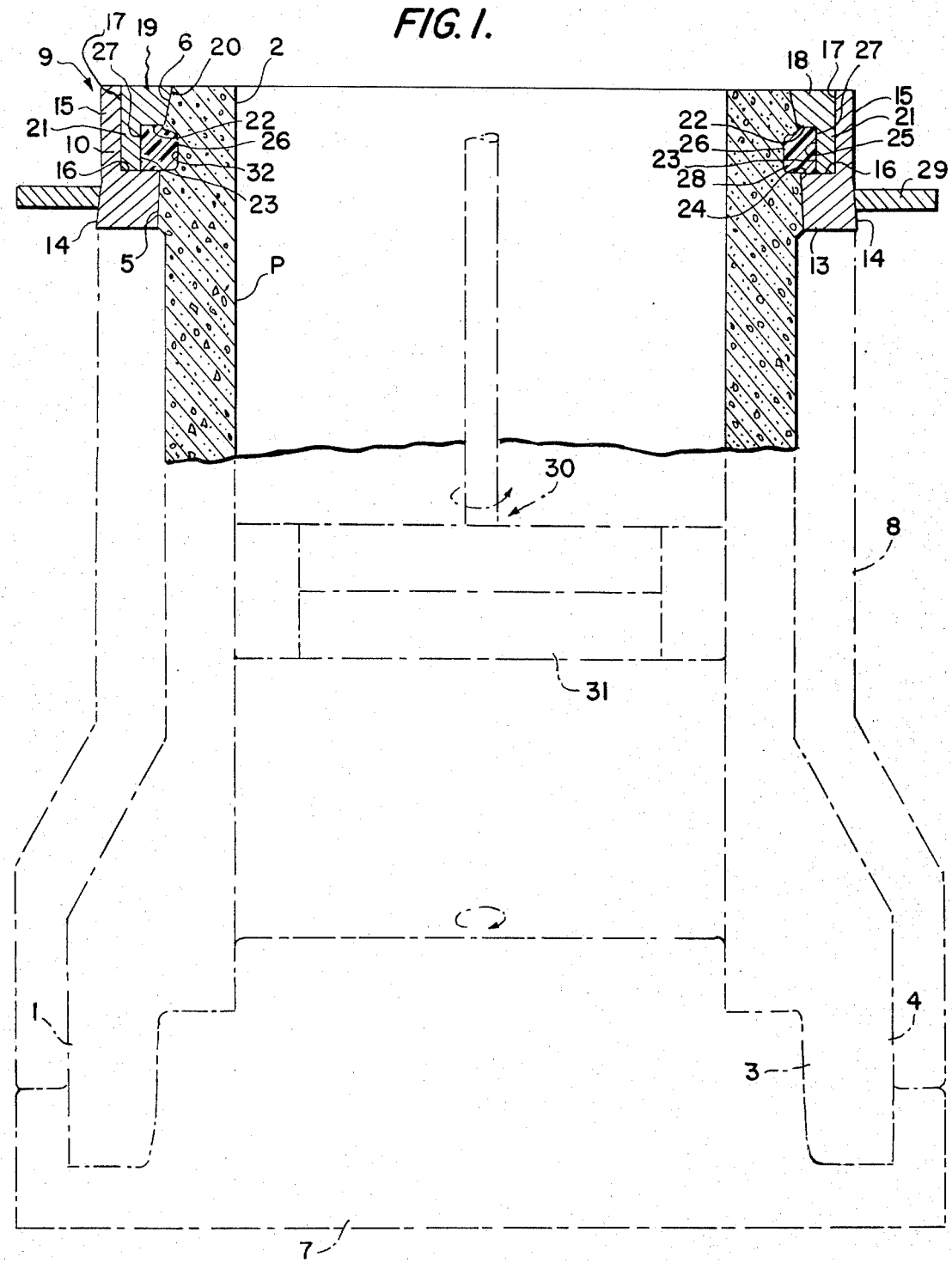

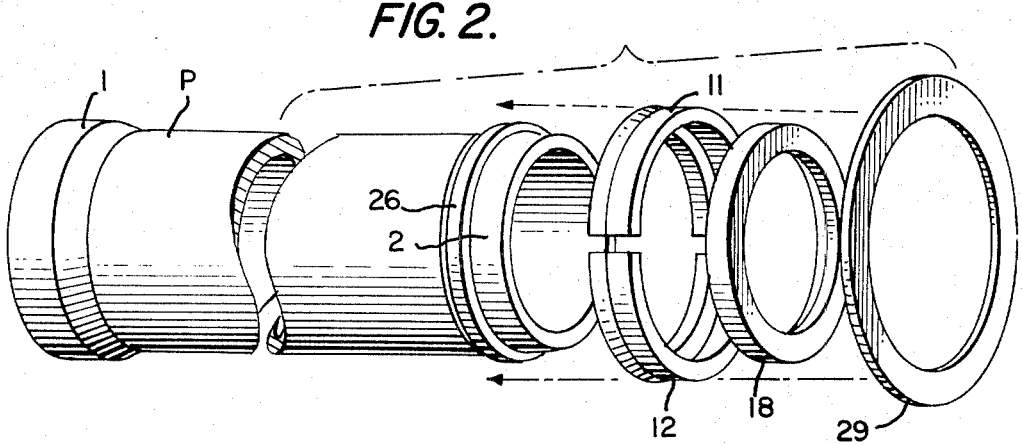
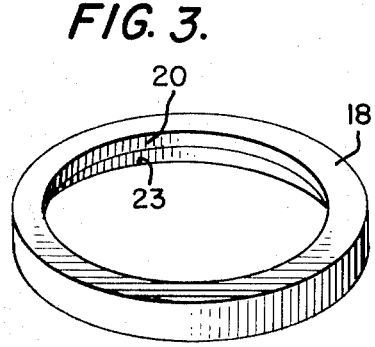
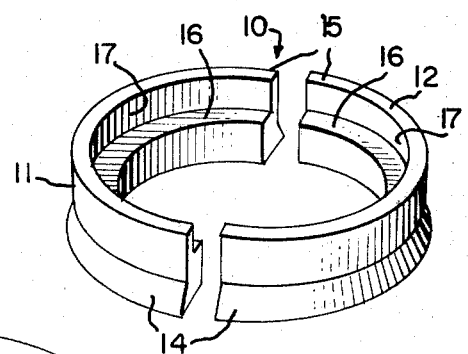
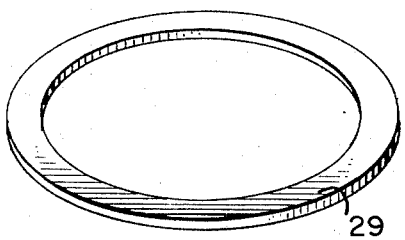
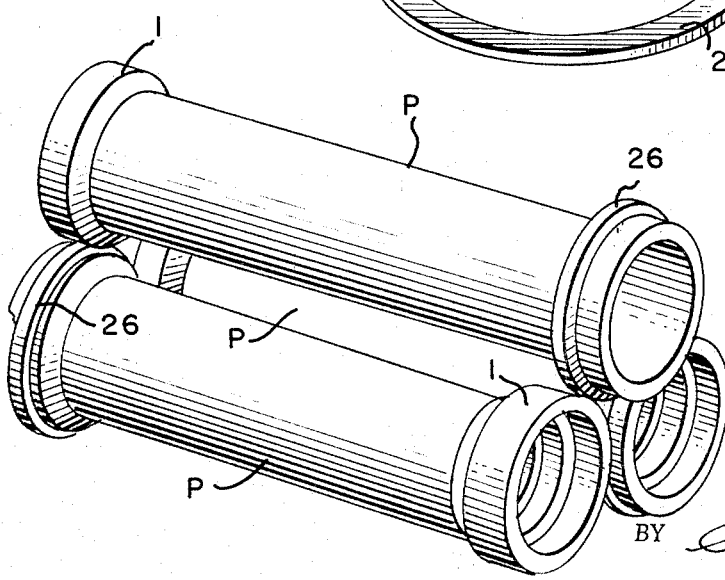

PIPE HAVING DISPOSABLE PROTECTIVE MEANS THEREON AND METHOD OF MAKING SAME

BACKGROUND OF THE INVENTION

This invention relates to a concrete pipe and to the method of making same, and more particularly, to a disposable protective ring on one end of the pipe for preventing damage to the pipe during handling and storage.

In the prior art, a concrete pipe is commonly manufactured with a bell or socket end and with a male or spigot end. This concrete pipe generally has a relatively thin wall and during handling and storage, the pipe is easily broken or damaged such as, for example, when it is struck by another pipe. In some instances, there is up to a 25 percent rejection rate of the pipes due to breakage and the like. This high rejection rate is both expensive and wasteful and in fact, the cost of disposing of the broken pipe often equals the cost of a new pipe. The problem is particularly acute at the male or spigot end of the pipe, which has a thinner wall than the socket or bell end of the pipe. Such a pipe is commonly manufactured in a Packerhead machine which includes a mold structure for forming the pipe and a cap of metal or the like for forming the male or spigot end of the pipe.

Typically, a plant set up for manufacturing the pipe would use a neoprene rubber insert in a cast iron retaining ring to form an O-ring groove in the spigot end of the pipe and such plant would normally have a quantity of 50 or more cast iron rings with inserts for each size of pipe to be manufactured. Approximately 600 pieces of pipe having a 4 foot length and an 8 inch diameter, for example, can be manufactured during one 8-hour shift; and it is, therefore, necessary to strip the retaining ring from the pipe while it is still green so that the retaining ring may be reused on other pipes. When the cast iron ring is pulled off the pipe, the neoprene strip or insert springs loose and often spalls the edges of the O-ring groove. Moreover, when the pipe is stacked in a storage area or handled for storage or shipment, the spigot end of the pipe is frequently broken.

Other manufacturers use a steel snap ring to form the O-ring groove in the spigot end of the pipe, and this snap ring is removed from the pipe as soon as the pipe is manufactured so that the snap ring may be used in manufacturing other pipes. Accordingly, the pipes are likely to be damaged during handling and storage.

The present invention provides a means for forming an O-ring groove in a spigot end of the pipe which is not removed immediately upon manufacture of the pipe and which is left in place during handling and storage of the pipe and is removed only when the pipe is to be installed to another pipe, said means comprising a resilient, disposable protective ring which forms the O-ring groove during manufacture of the pipe and which is left on the pipe during curing thereof and which protects the spigot end of the pipe during handling and storage to prevent breakage of the pipe.

OBJECTS OF THE INVENTION

It is an object of this invention to provide a pipe having protective means thereon and a method of making same.

It is a further object of this invention to provide a means for forming an O-ring groove in a spigot end of a pipe, which means is left in place on the pipe once the pipe is manufactured to protect the spigot end of the pipe during handling and storage.

Another object of this invention is to provide a resilient, disposable protective ring used to form an O-ring grove in the spigot end of a concrete pipe and which is left in place when the pipe is manufactured to protect the spigot end of the pipe during handling and storage, said ring being removed and thrown away when the pipe is installed to another pipe.

BRIEF DESCRIPTION OF THE DRAWINGS

FIG. 1 is a part sectional view in elevation of a portion of an apparatus for manufacturing the pipe and showing the means for forming the spigot end of the pipe.

FIG. 2 is an exploded perspective view of a pipe showing the means for forming the spigot end thereof at one end of the pipe.

FIG. 3 is a top perspective view of a portion of the apparatus for forming the spigot end of the pipe.

FIG. 4 is a top perspective view of another portion of the apparatus for forming the spigot end of the pipe.

FIG. 5 is a top perspective view of still another portion of the apparatus for forming the spigot end of the pipe.

FIG. 6 is a top perspective view of a plurality of concrete pipes in stacked relationship showing the manner in which the resilient disposable protective ring serves as a buffer between adjacent pipes to prevent breakage of the spigot ends thereof.

DETAILED DESCRIPTION OF THE INVENTION

Referring now to the drawings, wherein like reference numerals refer to like parts throughout the several views, a pipe P constructed in accordance with the present invention is shown in section in FIG. 1 encased in a portion of an apparatus for manufacturing the pipe.

The pipe P is an elongate cylindrical member having a bell or socket end 1 and a male or spigot end 2. The bell end 1 is of conventional construction and includes an enlarged diameter inside portion 3 and an enlarged outside diameter portion 4.

The spigot end 2 of the pipe has a thickened portion 5, the outer surface 6 of which is tapered inwardly toward the end thereof to aid in assembling the spigot end 2 of the pipe into a bell end of an adjacent pipe.

The apparatus for manufacturing the pipe P includes a socke curing pallet and "bell-down" unit indicated schematically at 7 and disposed in partially surrounding relationship to the bell end 1 of the pipe with a portion of the socket curing pallet and "bell-down" unit 7 extended inside the end 1 of the pipe P.

A cylindrical jacket mold 8 is arranged in surrounding relationship to the pipe P and determines the configuration and size of the pipe when concrete is poured thereinto in forming the pipe.

A cap for forming the spigot end of the pipe is indicated generally at 9 and is positioned at the upper end of jacket mold 8, as viewed in FIG. 1, and has a predetermined size and configuration in relation to the size and configuration of jacket mold 8 to give a selected size and configuration of the spigot end 2 of the pipe P. The cap 9 comprises a two-piece steel retaining ring 10 consisting of two semi-circular parts 11 and 12 (FIG. 4). The two parts 11 and 12 of the two-piece steel retaining ring 10, each include a thickened base portion 13 having an outwardly flared tapered surface 14 and a relatively narrow or thin axially upstanding wall or flange 15 thereon at the outer marginal edge of the thickened portion 13 and extending axially from the upper end of the tapered portion 14. The annular flange 15 and thickened portion 13 define an annular, axially facing shoulder 16 and annular, radially inwardly facing wall or surface 17.

A one-piece cast iron ring 18 has a thickened portion 19 with a radially inwardly facing tapered surface 20 and an axially depending annular wall or flange 21 extending downwardly from the outer marginal edge of thickened portion 19. The one-piece cast iron ring 18 is adapted to be disposed with the outer surface of flange 21 and thickened portion 19 disposed in mating abutting relationship with the surface 17 on flange 15 of two-piece retaining ring 10, and the lower edge of flange 21 in mating abutting relationship with shoulder 16 on thickened portion 13 of two-piece retaining ring 10. The flange 21 and thickened portion 19 of cast iron ring 18 define an axially downwardly facing shoulder 22 and a radially inwardly facing surface or wall 23. The thickness of flange 21 is only approximately one-half as great as the width of shoulder 16 and thus when the flange 21 is positioned against surface 17 and shoulder 16, a portion 24 of shoulder 16 is exposed. The shoulder 22, surface 23 and portion 24 of shoulder 16 define a generally rectangularly shaped recess 25.

A one-piece annular resilient disposable protective ring 26 of neoprene, polystyrene, or the like, having generally rectangular outer circumferential surface 27 is adapted to be clamped in recess 25 between shoulders 22 and 24 with the outer surface 27 in abutting relationship with surface 23 on flange 21 of cast iron ring 18.

The ring 26 has a thickness dimension greater than the depth of recess 25 and a portion 28 thereof accordingly projects radially inwardly beyond tapered surface 20 of ring 18.

A generally washer-shaped, one-piece steel locking ring 29 having an inside diameter slightly greater than the outside diameter of flange 15 and less than the maximum diameter of tapered surface 14 is adapted to be disposed in surrounding relationship to the two-piece steel retaining ring 10 for holding the retaining ring 10, cast iron ring 18 and disposable protective ring 26 in assembled relationship, the inside diameter of locking ring 29 engaging the tapered surface 14 of two-piece retaining ring 10 to securely wedge the portions together.

A rotatable and reciprocable packershaft 30 is disposed co-axially within jacket mold 8 and includes a roller head or packerhead 31, the outer diameter of which is spaced radially inwardly of the inner diameter of jacket mold 8 a predetermined amount to determine the thickness of the wall of pipe P.

In use, the jacket mold 8 is brought into operative relationship with the socket curing pallet and "bell-down" unit 7 as shown in FIG. 1. The packershaft 30 is disposed adjacent the bottom of jacket mold 8 in proximity to the socket curing pallet and "bell-down" unit 7. Concrete is then poured into the mold, filling the space between the "bell-down" unit 7 and the inside surface of jacket mold 8. The packershaft 30 and "bell-down" unit are slowly rotated, and the packershaft is simultaneously drawn upwardly through the jacket mold 8 as concrete is added thereto. Concrete is added to the mold and the packershaft drawn upwardly until the spigot end of the pipe is completed. The disposable protective ring 26 forms an O-ring groove 32 in the outer surface of the spigot end of the pipe. The pipe is subsequently removed from the mold for curing and the cap 9 is removed from the spigot end thereof. The steel locking ring 29 is first removed axially from around the two-piece retaining ring 10 which may then be simply separated and removed from around the one-piece cast iron ring 18 which is then slipped axially off the end 2 of the pipe. The resilient disposable protective ring 26 is left in position in the O-ring groove 32 on the spigot end of the pipe and serves as a bumper or buffer for preventing breakage of the spigot end of the pipe due to impact on the pipe during handling and storage.

FIG. 6 depicts a plurality of pipes P in stacked relationship and illustrates the manner in which the protective rings 26 prevent direct contact between spigot ends of adjacent pipes thereby precluding the possibility of breakage of the pipes P due to impact therebetween.

When the pipe is to be assembled to another pipe, the disposable protective ring 26 is removed and a suitable rubber O-ring or the like placed in the groove and the pipe then assembled to an adjacent pipe.

While the pipe has been described as manufactured with a "bell-down" system, it could equally as well be manufactured with a "bell-up" system. The specific manner of manufacture of pipe is not critical, the important point being the disposable protective ring 26 which is used to form the O-ring groove in the spigot end of the pipe and which serves as a bumper or buffer for protecting the pipe during handling and storage and is then removed and thrown away when the pipe is assembled to another pipe.

Accordingly, with the present invention, the high rejection rate of concrete pipe due to breakage and the like is substantially eliminated, thus reducing the cost of manufacturing the pipe and resulting in an eventual saving to the consumer.

While specific materials have been described for the various portions of the cap, other suitable materials could equally as well be used; and while the present invention is primarily intended for manufacturing pipes having a diameter of 4 inches to 15 inches and a length of from 2 feet to 12 feet, it could obviously be used in manufacturing pipes having different sizes.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A tubular pipe having an annular groove formed in its outer circumference adjacent at least one end thereof, a disposable protective means on said pipe comprising a disposable annular resilient means in said annular groove, said resilient means being positioned on said pipe during the manufacture thereof to create said annular groove, said disposable resilient means having an exposed outer surface for protecting the pipe against breakage during handling and storage, said disposable resilient means being readily removable from the pipe to permit the installation of an O-ring in said groove when it is desired to assemble the pipe to another pipe, the outer circumference of said pipe being substantially equal adjacent both sides of said annular groove so that said exposed outer surface of said resilient means is positioned outwardly of the said outer circumference of said pipe for engagement with other pipes when a plurality of pipes are stacked to prevent pipe to pipe contact.

2. A method of making a pipe having disposable protective means thereon comprising, providing a mold, putting concrete in said mold, operating a portion of said mold to form a pipe therein as concrete is put into said mold, providing an annular removable cap means at one end of said mold for forming one end of said pipe, providing a resilient means in said cap means having a portion thereof projecting radially inwardly into said concrete to form an annular groove in said one end of said pipe and having a portion thereof projecting radially outwardly from said concrete, removing said pipe from said mold, removing said removable cap means from said one end of said pipe and leaving said resilient means in said annular groove in said one end of said pipe to provide a protective means for said pipe during the handling and storage thereof.

3. The method of making a tubular pipe as in claim 2 wherein said annular ring is removed from said groove in said pipe prior to assembly of said pipe to another pipe to permit an O-ring to be installed in said groove.

* * * * *